United States Patent [19]

Rose et al.

[11] Patent Number: 5,724,567

[45] Date of Patent: Mar. 3, 1998

[54] SYSTEM FOR DIRECTING RELEVANCE-RANKED DATA OBJECTS TO COMPUTER USERS

[75] Inventors: Daniel E. Rose, Cupertino; Jeremy J. Bornstein, Redwood City; Kevin Tiene, Cupertino; Dulce B. Ponceleón, Palo Alto, all of Calif.

[73] Assignee: Apple Computer, Inc., Cupertino, Calif.

[21] Appl. No.: 231,656

[22] Filed: Apr. 25, 1994

[51] Int. Cl.$^6$ .................................................. G06F 17/30
[52] U.S. Cl. .................... 395/602; 395/603; 395/604; 395/605; 395/610; 395/327
[58] Field of Search ..................... 395/600, 325, 395/200, 650, 575, 602, 603, 604, 605, 610, 327

[56] References Cited

U.S. PATENT DOCUMENTS

| | | | |
|---|---|---|---|
| 5,107,419 | 4/1992 | MacPhail | 600/600 |
| 5,132,900 | 7/1992 | Gilchrist et al. | 364/419 |
| 5,167,011 | 11/1992 | Priest | 364/200 |
| 5,321,833 | 6/1994 | Chang et al. | 395/600 |
| 5,446,891 | 8/1995 | Kaplan et al. | 395/600 |
| 5,504,896 | 4/1996 | Schell et al. | 395/650 |

OTHER PUBLICATIONS

Goldberg, David et al, "Using Collaborative Filtering to Weave an Information Tapestry", *Communications of the ACM*, Dec. 1991, vol. 35, No. 12., pp. 61–70.

Jennings, Andrew et al, "A Personal News Service Based on a User Model Neural Network", *IEICE Transactions on Information and Systems*, Mar. 1992, No. 2, pp. 198–209.

Jacobs, Paul S. et al, "Scisor: Extracting Information from On–Line News", *Communications of the ACM*, Nov. 1990, vol. 33, No. 11, pp. 88–97.

Savoy, Jacques, "Searching Information in Hypertext Systems Using Multiple Sources of Evidence", *International Journal of Man–Machine Studies*, Jun. 1993, vol. 38, No. 6, pp. 1017–1030.

C.F.Renolds, "ON–LINE REVIEWS: a new application of the HICOM conferencing system.", IEEE Colloq., 1989, pp. 1–5.

Anselm Spoerri, "Virtual tools for information retrieval", IEEE Symposium, 1993, pp. 160–186.

Andrew Jennings, "Customer adaptive communication services.", IEEE, 1992, pp. 886–890.

Bussey et al., "Service Architecture, Prototype Decription, and Network implications of a personalized information grazing service.", IEEE INFOCOM, 1990, pp. 1049–1053.

M.F. Wyle, "A wide area network information filter." Artificial Intelligence on wall street, 1991 conference, 1991, pp. 10–15.

M. Rothman, "A New Music Retailing Technology Says, 'Listen Here'", *The New York Times*, Sunday, Jul. 4, 1993, pp. F8–9.

(List continued on next page.)

*Primary Examiner*—Thomas G. Black
*Assistant Examiner*—Cheryl R. Lewis
*Attorney, Agent, or Firm*—Burns, Doane, Swecker & Mathis, L.L.P.

[57] ABSTRACT

An information access system stores items of information in an unstructured global database. When a user requests access to the system, the system delivers to that user an identification of only those items of information which are believed to be relevant to the user's interest. The determination as to the items of information that are relevant to a user is carried out by ranking each available item in accordance with any one or more techniques. In one approach, the content of each document is matched with an adaptive profile of a user's interest. In another approach, a feedback mechanism is provided to allow users to indicate their degree of interest in each item of information. These indications are used to determine whether other users, who have similar or dissimilar interests, will find a particular item to be relevant.

39 Claims, 4 Drawing Sheets

OTHER PUBLICATIONS

J. Karlgren, "Using Reader Data as a Basis for Measuring Document Proximity", *An Algebra for Recommendations*, pp. 1–9; no date.

R.K. Belew, "Adaptive Information Retrieval: Using a connectionist representation to retrieve and learn about documents", *12th Int'l Conference on Research & Development in IR*, Jun. 1989.

T.W. Malone et al, "The Information Lens: An Intelligent System for Information sharing in Organizations", *CHI '86 Proceedings*, Apr. 1986, pp. 1–8.

G. Fischer et al, "Information Access in Complex, Poorly Structured Information Space", *CHI '91 Proceedings*, Apr.–May, 1991.

B. Sheth et al, "Evolving Agents for Personalized Information Filtering", *Proceedings of the Ninth IEEE Conference on Artifical Intelligene for Applications, CAIA '93*, Orlando, Florida, Mar. '93.

"Announcement of Bellcore Video Rating System", no date.

| 28 | Your Messages from "Standard" | | | |
|---|---|---|---|---|
| Score | Date | Author | Title | |
| ▓ | Fri 06/25... | —— | —— | |
| ▓ | Thu 09/30... | —— | Winter Olympics Update | |
| ▓ | Thu 08/05... | —— | —— | |
| ▓ | Thu 06/24... | —— | —— | |
| ▓ | Thu 07/22... | —— | —— | |
| ▓ | Thu 10/07... | —— | —— | |
| ▓ | Tue 08/03... | —— | —— | |
| ▓ | Wen 06/23... | —— | —— | |
| ▓ | Thu 09/30... | —— | —— | |
| ▓ | Mon 07/19... | —— | —— | |
| ▓ | Tue 07/27... | —— | —— | |
| ▓ | Fri 09/24... | —— | —— | |
| ▓ | Thu 07/08... | —— | —— | |
| ▓ | Fri 06/19... | —— | —— | |

*FIG. 3*

WINTER OLYMPICS UPDATE

Author: ——
Date: Thu 09/30/1993 06:02:58 PM
Subject: Winter Olympics Update

*FIG. 4*

| Score | Title |
|---|---|
| ▰▰▰ | Jagged Edge |
| ▰▰▰ | Sea of Love |
| ▰▰▰ | D.O.A. |
| ▰▰ | The Eye of the Needle |
| ▰▰ | Dave |
| ▰▰ | Sleepless in Seattle |
| ▰ | Lost in America |
| ▰ | Mephisto |
| ▰ | Melvin and Howard |
| ▰ | Heat and Dust |
| ▫ | One Against the Wind |
| ▫ | Flashdance |
| ▫ | Duel |
|  | In the Line of Fire |
|  | Boxing Helena |
|  | Indecent Proposal |
| ▫ | A River Runs Through It |
| ▫ | Cliffhanger |
| ▫ | Joe Versus the Volcano |
| ▫ | Not Without My Daughter |
| ▫ | Fat Man and Little Boy |
| ▫ | Runaway Train |
| ▫ | Ordeal by Innocence |
| ▫ | Cujo |
| ▰ | THX 1138 |
| ▰▰ | The River |
| ▰▰▰ | Black Rain |

Your Messages from "Movie Recommendation"

*FIG. 7*

SYSTEM FOR DIRECTING RELEVANCE-RANKED DATA OBJECTS TO COMPUTER USERS

FIELD OF THE INVENTION

The present invention is directed to information access in multiuser computer systems, and more particularly to a computer-based information system that enables users to access information from a wide variety of sources.

BACKGROUND OF THE INVENTION

The use of computers to obtain and/or exchange a number of different types of information is becoming quite widespread. Currently, there are three prevalent types of on-line systems that can be employed to find and/or exchange information. One of these systems comprises electronic mail, in which a user receives messages, e.g. documents, that have been specifically sent to his or her electronic mailbox. Typically, to receive the documents, no explicit action is required on the user's part, except to access the mailbox itself. In most systems, the user is informed whenever new messages have been sent to his or her mailbox, enabling them to be read in a timely fashion. Electronic mail systems can be based on a local area network server or on a distributed wide area network message protocol. Once a user receives a message through an electronic mail system, the user can maintain the message indefinitely in the system, if space permits, or save the message to a file maintained in the user's personal computer, or the like.

Another medium that is used to exchange information on-line is electronic bulletin board systems. In these types of systems, users can post documents or files to directories corresponding to specific topics, where they can be viewed by other users. In order to view the documents, the other users must actively select and open the directories containing topics of interest. Articles and other items of information posted to bulletin board systems typically expire after some time period, and are then deleted.

The third form of information exchange is by means of text retrieval from static data bases. A group of users, or a service bureau, can put documents of common interest on a file server. Using a text searching tool, individual users can locate files matching a specific topical query. Some services of this type enable users to search personal databases, as well as databases of other users.

While each of these on-line systems finds utility in certain environments, they are also subject to certain limitations. For example, users of electronic mail services are increasingly finding that they receive more mail than they can usefully handle. Part of this problem is due to the fact that junk mail of no particular interest is regularly sent in bulk to lists of user accounts. In order to view messages of interest, the user may be required to sift through a large volume of undesirable mail.

Bulletin board users can only see documents related to topics they explicitly select. As a result, it is possible to miss entire conversations of interest if the user does not know which directories to search. In addition, most bulletin board systems do not have a convenient mechanism for notifying users when new items of information have been posted. Thus, a user may be required to regularly check directories of interest in the system to avoid missing potentially relevant articles before they are deleted.

While text retrieval systems provide users with flexibility in searching for items of personal interest, they do not provide the ability to have other users direct relevant messages to any particular user. Some text retrieval systems may support persistent queries which provide the user with a notification of new information as it becomes available. However, such information is limited to that which explicitly matches previously established queries. Other information which may be of interest, but which does not explicitly match a query, would be missed.

As a result of these various limitations, users of currently available on-line services may miss the opportunity to view documents that are critically relevant to them, because the documents were not explicitly delivered to their mailboxes or to places where they might normally look for the information. It is therefore desirable to provide an information access system that overcomes the restrictions attendant with the currently available systems.

SUMMARY OF THE INVENTION

In accordance with the present invention, an information access system which meets the foregoing objective does not require documents and other items of interest to be sent to a specific list of users or to a specific topic. Rather, in the system of the present invention, the items of information are placed in an unstructured global database that is stored on a server computer. The database is global in the sense that it contains all of the items of information that can be accessed by any user in a group to which the system pertains. The information need not be classified by topic or addressed to specific mailboxes or other user designations. In other words, each item of information is present in a global pool of information that is available to all users. When a user accesses the system, the system delivers to that user an identification of those items of information in the global database which are believed to be important to the user. The system may also notify the user when new relevant items become available.

The determination as to the items of information that are believed to be important to a user is carried out by ranking each available item. A variety of techniques can be used to rank the information. For example, the content of each document can be matched with an adaptive profile of a user's interest. Alternatively, or in addition, a feedback mechanism can be provided, to allow users to indicate their degree of interest in each retrieved document. These indications can be used to determine whether other users, who typically agree or disagree with a given user, will find the document to be of interest.

The foregoing features of the invention, as well as the advantages offered thereby, are explained in greater detail hereinafter with reference to exemplary implementations illustrated in the accompanying drawings.

BRIEF DESCRIPTION OF THE DRAWINGS

FIG. 3 is an example of an interface window for presenting a sorted list of messages to a user;

FIG. 4 is an example of an interface window for presenting the contents of a message to a user;

FIG. 7 is an example of an interface window for a movie recommendation database.

DETAILED DESCRIPTION

To facilitate an understanding of the principles of the present invention, they are described hereinafter with reference to the implementation of the invention in a system having multiple personal computers that are connected via a network. It will be appreciated, however, that the practical applications of the invention are not limited to this particular environment. Rather, the invention can find utility in any situation which facilitates communication between users and provides for access to information. For example, it is equally applicable to other types of multiuser computer systems, such as mainframe and minicomputer systems in which many users can have simultaneous access to the same computer.

In a system according to the present invention, a variety of different types of information can be available for access by users. In addition to more conventional types of information that are immediately interpretable by a person, such as text, graphics and sound, for example, the accessible information might also include data and/or software objects, such as scripts, rules, data objects in an object-oriented programming environment, and the like. For ease of understanding, in the following description, the term "message" is employed in a generic manner to refer to each item of information that is provided by and accessible to users of the system, whether or not its contents can be readily comprehended by the person receiving it. A message, therefore, can be a memorandum or note that is addressed from one user of the system to another, a textual and/or graphical document, or a video clip. A message can also be a software data structure or any other type of information available through the system.

Figure 1:
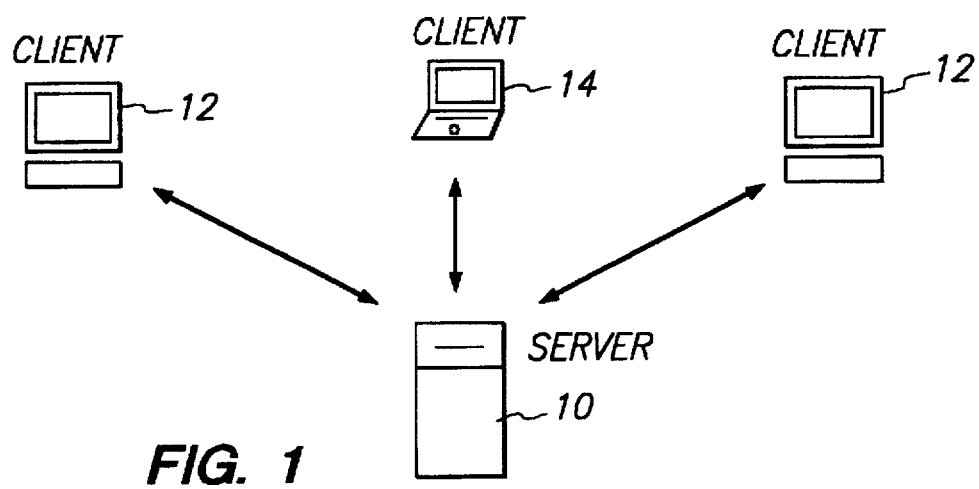
FIG. 1 is a general diagram of the hardware architecture of one type of information access system in which the present invention can be implemented.

One example of a hardware architecture for an information access system implementing the present invention is illustrated in FIG. 1. The specific hardware arrangement does not form part of the invention itself. Rather, it is described herein to facilitate an understanding of the manner in which the features of the invention interact with the other components of an information access system. The illustrated architecture comprises a client-server arrangement, in which a database of information is stored at a server computer 10, and is accessible through various client computers 12, 14. The server 10 can be any suitable micro, mini or mainframe computer having sufficient storage capacity to accommodate all of the items of information to be presented to users. The client computers can be suitable desktop computers 12 or portable computers 14, e.g. notebook computers, having the ability to access the server computer 10. Such access might be provided, for example, via a local area network or over a wide area through the use of modems, telephone lines, and/or wireless communications.

Each client computer is associated with one or more users of the information access system. It includes a suitable communication program that enables the user to access messages stored at the server machine. More particularly, the client program may request the user to provide a password or the like, by means of which the user is identified to the server machine. Once the user has been identified as having authorized access to the system, the client and server machines exchange information through suitable communication protocols which have been established for the system.

Figure 2:
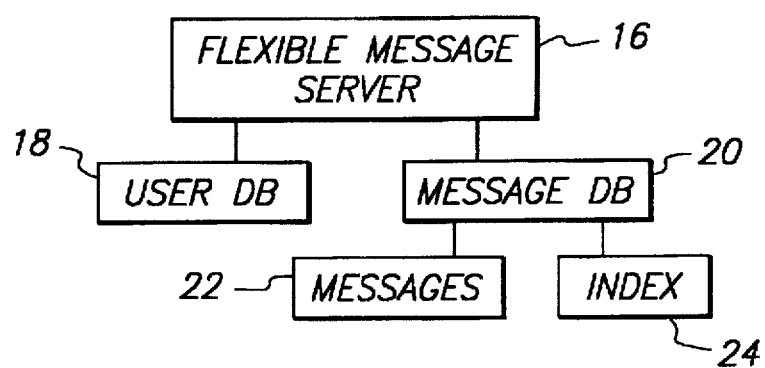
FIG. 2 is a block diagram of the software architecture for the server program.

The general architecture of the server's program is illustrated in block diagram form in FIG. 2. Referring thereto, at the highest level the server program contains a message server 16. The message server carries out communications with each of the clients, for example over a network, and retrieves information from two databases, a user database 18 and a message database 20. The user database 18 contains a profile for each of the system's users, as described in greater detail hereinafter. The message database is a global, unstructured database which provides access to all of the stored messages 22 supplied by and to users of the database. In addition, the message database has associated therewith an index 24, which provides a representation of each of the stored messages 22, for example its title. The index can contain other information pertinent to the stored messages as well.

The message database 20 is described as being "unstructured" to denote the fact that the messages stored therein are not classified under different topic categories or otherwise arranged in a structured manner that requires a user to designate a navigation path or the like to locate items of interest. Rather, all of the messages are stored in a global pool that is accessed by all users. Furthermore, this pool can contain many different types of information. For example, it can contain text documents, video clips, and software data structures, all of which can be presented to a user in response to a single request for access to information.

In the operation of the system, when a user desires to retrieve messages, the user accesses the system through the client program on one of the client machines 12, 14. As part of the access procedure, the user may be required to log into the system. Through the use of a password or other appropriate form of identification, the user's identity is provided to the server 10, which acknowledges the user's right to access the system or disconnects the client machine if the user has not been authorized. When the access procedure is successful, the message server 16 on the server machine retrieves the user's profile from the user database 18. This profile is used to rank the messages stored within the system. The particular information within the user's profile will be based upon the ranking technique that is employed, as described in detail hereinafter. Once the user's profile is retrieved, all of the available messages are ranked on the basis of a predicted degree of relevance to the user. Once the messages have been ranked, a list is formed in which the messages are sorted from highest to lowest ranking.

The list of ranked messages is provided to the client program, which displays some number of them through a suitable interface. One example of such an interface is illustrated in FIG. 3. Referring thereto, the interface comprises a window 26 containing a number of columns of information. The left hand column 28 indicates the relative ranking score of each message, for example in the form of a horizontal thermometer-type bar 30. The remaining columns can contain other types of information that may assist the user in determining whether to retrieve a particular message, such as the date on which the message was posted to the system, the message's author, and the title or subject of the message. The information that is displayed within the window can be stored as part of the index 24. If the number of messages is greater than that which can be displayed in a single window, the window can be provided with a scroll bar 32 to enable the user to scroll through and view all of the message titles.

In general, every message available through the system, i.e. each message stored in the database 22, can be presented to any user via the window 26, in ranked order. In practice, however, it is unlikely that a user would want to view those messages having a low ranking. Therefore, the client program or the server program can employ a suitable selection threshold, so that messages having a ranking below a certain threshold are not displayed. For example, the number of messages to be displayed might be fixed, e.g. twenty-five, so that only the twenty-five current messages having the highest ranking are presented to the user. Alternatively, only those messages whose ranking value exceeds a certain limit can be displayed. Preferably, the selection threshold can be changed by the user.

When the user desires to view any particular message shown in the window 26, that message is selected within the window, using any suitable technique for doing so. Once a message has been selected by the user, the client program informs the server 10 of the selected message. In response thereto, the server retrieves the complete text of the message from the stored file 22, and forwards it to the client, where it is displayed.

An example of an interface for the display of a message is illustrated in FIG. 4. Referring thereto, the message can be displayed in an appropriate window 34. The contents of the message, e.g. its text, is displayed in the main portion of the window. Located above this main portion is a header 36 which contains certain information regarding the message. For example, the header can contain the same information as provided in the columns shown in the interface of FIG. 3, i.e., author, date and rifle. Located to the right of this information are two icons which permit the user to indicate his or her interest in that particular message. If the user found the message to be of interest, a "thumbs-up" icon 38 can be selected. Alternatively, if the message was of little or no interest to the user, a "thumbs-down" icon 40 can be selected. When either of these two icons is selected, the indication provided thereby is forwarded to the server 10, where it is used to update the user profile.

In the example of FIG. 4, the user is provided with only two possible selections for indicating interest, i.e. "thumbs-up" or "thumbs-down", resulting in very coarse granularity for the indication of interest. If desired, finer resolution can be obtained by providing additional options for the user. For example, three options can be provided to enable the user to indicate high interest, mediocre interest, or minimal interest.

Preferably, in order to obtain reliable information about each user, it is desirable to have the user provide an indication of degree of interest for each message which has been retrieved. To this end, the interface provided by the client program can be designed such that the window 34 containing the content of the message, as illustrated in FIG. 4, cannot be closed unless one of the options is selected. More particularly, the window illustrated in FIG. 4 does not include a conventional button or the like for enabling the window to be closed. To accomplish this function, the user is required to select one of the two icons 38 or 40 which indicates his or her degree of interest in the message. When one of the icons is selected, the window is closed and the message disappears from the screen. With this approach, each time a message is retrieved, feedback information regarding the user's degree of interest is obtained, to thereby maintain an up-to-date profile for the user.

If the user expresses interest in the message, he can be presented with various options upon closing the message window. For example, the user might be able to archive the message, either locally or at the central server. Any suitable technique for archiving messages can be employed in this context. As another option, the user might be given the ability to specify others to whom the message should be directed. For example, when another user is specified, the message might be tagged with a suitable attribute that will ensure the message is highly ranked for that other user when he accesses the system.

Figure 5A:
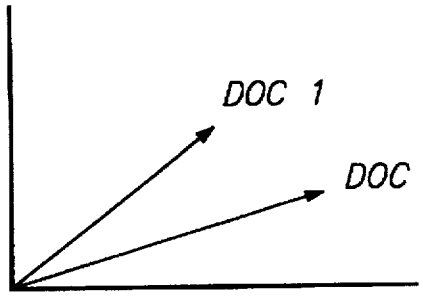
FIG. 5A is a graph of content vectors for two documents in a two-term space.

The ranking of messages in accordance with a user profile can be carried out with a number of different approaches. For example, the ranking can be based upon the content of the message, or upon indications provided by other users who have retrieved the message. In a content-based approach, each term, e.g. each word, in a document can be assigned a weight, based on its statistical importance. Thus, for example, words which frequently occur in a particular language are given a low weight value, while those which are rarely used have a high weight value. The weight value for each term is multiplied by the number of times that term occurs in the document. Referring to FIG. 5A, the results of this procedure is a vector of weights, which represents the content of the document.

The example of FIG. 5A illustrates a two-dimensional vector for each of two documents. In practice, of course, the vectors for document content would likely have hundreds or thousands of dimensions, depending upon the number of terms that are monitored. For further information regarding the computation of vector models for indexing text, reference is made to *Introduction To Modern Information Retrieval* by Gerald Salton and Michael J. McGill (McGraw-Hill 1983), which is incorporated herein by reference.

Each user profile also comprises a vector, based upon the user's indications as to his relative interest in previously retrieved documents. Each time a user provides a new response to a retrieved message, the profile vector is modified in accordance with the results of the indication. For example, if the user indicates interest in a document, all of the significant terms in that document can be given increased weight in the user's profile.

In the preceding example, the elements of a message, such as words in a document, are used to compute vectors for the messages and user profiles. It will be appreciated, of course, that the vector need not be based solely on such elements. Rather, any suitable attribute of a message can be employed to determine its relevance vector. These attributes can be explicit in the message, e.g. its time of creation, or be derived from information related to the message.

Each user in the system will have at least one profile, based upon the feedback information received each time the user accesses the system. If desirable, a single user might have two or more different profiles for different task contexts. For example, the user might have one profile for work-related information and a separate profile for messages pertaining to leisure and hobbies.

Figure 5B:
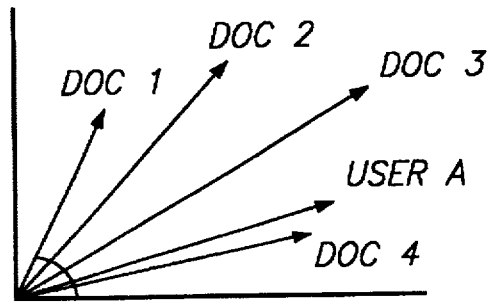
FIG. 5B is a graph of a user profile vector and several document vectors in a two-term space.

A prediction of a user's likely interest in a particular document is based on the similarity between the document's vector and the user's profile vector. For example, as shown in FIG. 5B, a score of the document's relevance can be indicated by the cosine of the angle between that document's vector and the user's profile vector. A document having a vector which is close to that of the user's profile, such as Document 4, will be highly ranked, whereas those which are significantly different will have a lower ranking, for example Document 1.

Figure 6:
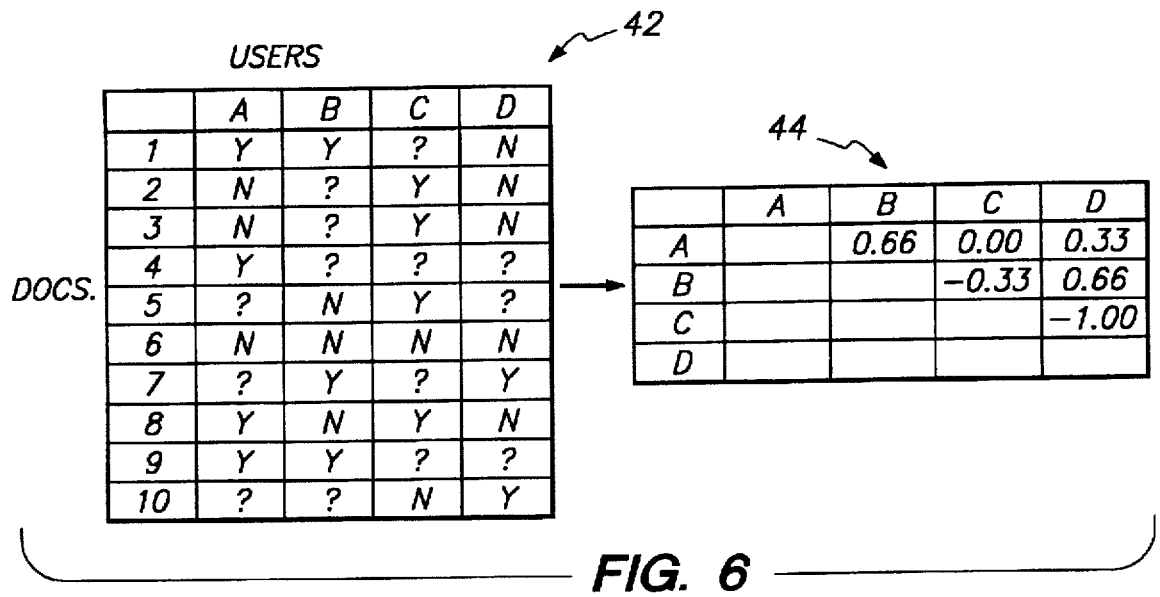
FIG. 6 illustrates the generation of a correlation chart.

A second approach to the prediction of a user's interest in information can be based upon a correlation with the indications provided by other users. Referring to FIG. 6, each time a user retrieves a document and subsequently provides an indication of interest, the result can be stored in a table 42. Using the information in this table, a correlation matrix R can be generated, whose entries indicate the degree of correlation between the various users' interests in commonly retrieved messages. More precisely, element Rij contains a measure of correlation between the i-th user and the j-th user. One example of such a matrix is the correlation matrix illustrated at 44 in FIG. 6. In this example, only the relevant entries are shown. That is, the correlation matrix is symmetric, and the diagonal elements do not provide any additional information for ranking purposes.

Subsequently, when a user accesses the system, the feedback table 42 and the correlation matrix 44 are used to predict the likelihood that the user will be interested in any given document. As an example of one of the many different algorithms that can be employed for this purpose, a prediction score, $P_{ij}$ for the i-th user regarding the j-th document, can be computed as:

$$P_{ij} = \sum_{k \neq i,j} R_{ik} V_{kj}$$

where $R_{ik}$ is the correlation of users i and k, the $V_{kj}$ is the weight indicating the feedback of user k on document j. Thus, for the corresponding data in FIG. 6, the prediction score for User C regarding Document 1 is as follows:

$$(0.00*1)+(-0.33*1)+(-1.00*-1)=0.67$$

In this formula, each parenthetical product pertains to one of the other users, i.e. A, B and D, respectively. Within each product, the first value represents the correlation measure between the other user and the current user in question, as shown in the matrix 44. The second value indicates whether the other user voted favorably (+1) or negatively (-1) after reading the document, as indicated in the table 42. If the user had not yet voted, a value of zero would be used for the weight factor. Rather than using the values +1 and -1, any other numbering arrangement can be employed to indicate a user's vote.

The foregoing prediction is computed for each document to be presented to the user, and the resulting scores are then ranked to determine the order of presentation.

The preceding example is only one of the many possible ways in which to compute coefficients which identify the correspondence between various users' interests. Other techniques are also applicable. For example, regression analysis can be used to identify the similarity of responses between users, and the amount by which other users' responses should be weighted for a given user. Alternatively, principal component analysis can be used to identify underlying aspects of the data that predict a score.

In a preferred implementation of the invention, a combination of content-based and correlation-based prediction is employed to rank the relevance of each item of information. For example, the scores that are obtained from a weighted sum of each of the content and correlation predictors can be obtained, to determine a final ranking score. Alternatively, multiple regression analysis can be utilized to combine the various factors. In this approach, regression methods are employed to identify the most important attributes that are used as predictors, e.g. salient terms in a document and users having similar feedback responses, and how much each one should be weighted. Similarly, principal components analysis can be used for this purpose.

As another example, evolutionary programming techniques can be employed to analyze the available data regarding content of messages and user correlations. One type of evolutionary programming that is suitable in this regard is known as genetic programming. In this type of programming, data pertaining to the attributes of messages and user correlation are provided as a set of primitives. The various types of data are combined in different manners and evaluated, until the combination which best fits known results is found. The result of this combination is a formula or program that describes the data which can best be used to predict a given user's likely degree of interest in a message. For further information regarding genetic programming, reference is made to Koza, John R., *Genetic Programming: On The Programming of Computers By Means of Natural Selection*, MIT Press 1992.

In a more specific implementation of evolutionary programming, the analysis technique known as genetic algorithms can be employed. This technique differs from genetic programming by virtue of the fact that pre-defined parameters pertaining to the items of information are employed, rather than more general programming statements. For example, the particular attributes of a message which are to be utilized to define the prediction formula can be established ahead of time, and employed in the algorithms. For further information regarding this technique, reference is made to Goldberg, David E., *Genetic Algorithms in Search, Optimization and Machine Learning*, Addison-Wesley 1989.

Another form of predictor can be based upon spreading activation. This type of predictor operates in the manner similar to a neural network. In this approach, nodes in the network represent users, documents, and terms or concepts. Other attributes can be incorporated as other node types. Links are established between some of the nodes, such as between documents and the most salient terms in them, or between users and terms in documents they liked. These links have weights that indicate the strength of the association. When messages are to be ranked for a user, the system activates the node representing that user. This activation flows through the network, becoming stronger or weaker depending on the link weights. The document nodes are then read in descending order of activation, and this provides the ranked list that is presented to the user. When the user votes on documents, this changes the link weights and in some cases builds new links. The spreading activation method automatically incorporates the notion of social contribution from other users, because all users share the same network. If one user likes the same thing as another, their votes will affect each other's rankings.

In addition to various ways of combining content and correlation scores, other ranking schemes can be incorporated using other attributes. Information regarding event times, author, type of data and other items of interest can be used in the ranking equation. For example, if a message is a call for submitting papers to a conference, its score could rise as the deadline approached, then fall when it had passed. More generally, older items might get lower scores if all other relevant factors were equal. These various types of data can be combined using any of the data analysis techniques described previously, as well as any other well-known analysis technique.

From the foregoing, it can be seen that the present invention provides for the flow of information within a community of users. Rather than require that items of information be addressed to specific users, or requiring the users to specifically select categories of interest, all available items of information are ranked in accordance with a predicted degree of relevance to the individual users, and automatically presented to the user in accordance with their ranking. Originators of messages do not have to be concerned with who will find a particular message to be of interest, as in electronic mail systems, or into which topical category it should be placed. Similarly, recipients do not have to determine where to look to find items of interest. The information access system automatically brings the right users together with the appropriate messages.

Furthermore, the system of the present invention provides for social interaction within the community of users, since each individual can benefit from the experiences of others. A user who has written about a particular topic would have other messages relating to that same topic automatically presented to him or her, without awareness of the authors of these other items of information. A person with an average interest in a subject might encounter it casually while browsing through recent topics of discussion. On the other hand, users with no interest at all would be unlikely to see the item, although it would always be accessible to them if they wanted to find it, by looking far down on their lists of sorted messages or by conducting a search that would locate the item.

The invention takes advantage of the fact that a community of users is participating in the presentation of information to users. In current systems, if a large number of readers each believe a message is significant, any given user is no more likely to see it than any other message. Conversely, the originator of a relatively uninteresting idea can easily broadcast it to a large number of people, even though they may have no desire to see it. In the system of the present invention, however, the likelihood of encountering a particular message takes into account not only on the user's own interests, but also feedback from the community.

Depending upon the relevance prediction technique that is employed, the ranking of messages can be computed at different times. For example, in a content-only predictor, rankings of messages can be changed when a user gives a thumbs-up or thumbs-down vote on a retrieved message. In contrast, in a correlation-only predictor, rankings for a given user change when another user who has seen at least one item in common with the given user votes on a message.

The frequency with which rankings are recomputed can also be varied as desired. For example, it can be continual, e.g. each time a user votes on a message. Alternatively, periodic recomputing may be sufficient, e.g. once in the middle of each night. After rankings have been computed, particularly relevant messages can be identified for each user, i.e. messages whose rankings exceed a certain threshold, and the user can be automatically notified of the identity of those messages the next time he or she accesses the system.

In the embodiment of the invention described thus far, all items of information available to users are stored in a single global database 22. If desired, additional databases directed to specific categories of information can be included. For example, a database of movie descriptions can be provided, to make movie recommendations to users. Each time a user sees a movie, he or she can record his or her reaction to it, e.g. like or dislike. This information is used to update the user's profile for the movie database, as well as provide information to rank that movie for viewing by other users whose interests in movies are similar or opposed. An example of a user interface for presenting this information is shown in FIG. 7. Referring thereto, it can be seen that the title of each movie is accompanied by a recommendation score 46. As an alternative to the message interface of FIG. 3, in the interface of FIG. 7 the scores 46 are negative as well as positive, to provide a clearer indication that the viewer will probably dislike certain movies. The values that are used for the raking display can be within any arbitrarily chosen range.

To facilitate an understanding of the invention, its principles have been explained with reference to specific embodiments thereof. It will be appreciated, however, that the practical applications of the invention are not limited to these particular embodiments. The scope of the invention is set forth in the following claims, rather than the foregoing description, and all equivalents which are consistent with the meaning of the claims are intended to be embraced therein.

What is claimed:

1. An information access system for automatically presenting users with information items of interest, comprising:

a computer system containing a database of information items available to be presented to users of the system;

at least one access device for enabling users to communicate with the computer system and access any of the items of available information;

means for storing a user profile for each user having access to the available items of information;

means for raking the likely degree of interest for each of the available items of information in accordance with a user profile;

means for presenting the items of information to an access device in order of ranking and enabling a user to retrieve each item;

means for enabling the user to indicate that user's interest in each retrieved item of information; and means for updating the user's profile in response to indications of interest provided by the user.

2. The information access system of claim 1, wherein said ranking means ranks the available items of information for a user on the basis of at least one attribute pertaining to each item of information.

3. The information access system of claim 2, wherein said attribute is the contents of the item of information.

4. The information access system of claim 2, wherein said attribute is the type of data comprising the item of information.

5. The information access system of claim 1, wherein said ranking means ranks each available item for a user on the basis of a combination of the content of the item and correlation with indications of interest in that item provided by other users.

6. The information access system of claim 5, wherein said ranking is based upon a regression analysis of content-based and correlation-based attributes.

7. The information access system of claim 1, wherein said ranking means ranks the available items of information on the basis of a date associated with each item.

8. The information access system of claim 1, wherein said ranking means utilizes a spreading activation technique to rank the items of information.

9. The information access system of claim 1, wherein said ranking means produces a formula which predicts the interest of a user in an item of information on the basis of at least one of a collection of votes of other users relating to that item of information, a user profile and an attribute related to that item of information.

10. The information access system of claim 9, wherein said formula is based on all three of said collection of votes, user profile and attribute.

11. The information access system of claim 9, wherein said formula is produced by means of genetic algorithms.

12. The information access system of claim 9, wherein said formula is computed in accordance with genetic programming.

13. The information access system of claim 1, wherein a vector is determined for each item of information and for each user profile, and the ranking of an item of information is based on the similarity of its vector with the vector profile for a given user.

14. The information access system of claim 1, wherein said ranking means employs evolutionary programming techniques to predict a user's interest in items of information.

15. An information access system for automatically presenting users with information items of interest, comprising:
- a computer system containing a database of information items available to be presented to users of the system;
- at least one access device for enabling users to communicate with the computer system and access any of the items of available information;
- means for storing a user profile for each user having access to the available items of information;
- means for ranking the likely degree of interest for each of the available items of information in accordance with a user profile, on the basis of correlation with indications of interest provided by other users;
- means for presenting the items of information to an access device in order of ranking and enabling a user to retrieve each item;
- means for enabling the user to indicate that user's interest in each retrieved item of information; and
- means for updating the user's profile in response to indications of interest provided by the user.

16. The information access system of claim 15, wherein said correlation is obtained by means of regression analysis of indications of interest provided by said other users.

17. The information access system of claim 15, wherein said ranking means utilizes a spreading activation technique to rank the items of information.

18. The information access system of claim 15, wherein said ranking means produces a formula which predicts the interest of a user in an item of information on the basis of at least one of a collection of votes of other users relating to that item of information, a user profile and an attribute related to that item of information.

19. The information access system of claim 18, wherein said formula is based on all three of said collection of votes, user profile and attribute.

20. The information access system of claim 18, wherein said formula is produced by means of genetic algorithms.

21. The information access system of claim 18, wherein said formula is computed in accordance with genetic programming.

22. The information access system of claim 15, wherein a vector is determined for each item of information and for each user profile, and the ranking of an item of information is based on the similarity of its vector with the vector profile for a given user.

23. A method for providing information to users of a computer system, comprising the steps of:
- storing items of information in an unstructured database within the computer system;
- determining and storing user profiles for users of the computer system who have access to the items of information;
- receiving a request from a user for access to the stored information;
- determining the user's likely degree of interest in items of information stored in said database, in accordance with that user's profile, and ranking the items of information in accordance with their determined degrees of interest; and
- displaying the items of information with an indication of their relative rankings.

24. The method of claim 23 wherein said items of information are displayed in order of their ranking.

25. The method of claim 23 wherein the user profiles and the determined degree of interest in items of information are based upon at least one attribute associated with each item of information.

26. The method of claim 25 wherein said attribute is the content of the item of information.

27. The method of claim 23 further including the steps of selecting an item of information from those which are displayed, providing an indication of the user's actual interest in the selected item of information, and storing the user's indicated interest.

28. The method of claim 23 wherein the step of determining a likely degree of interest in an item of information comprises the steps of establishing the correlation between indications provided by a given user and those provided by other users, and determining a prediction value for the item of information based upon said correlation and the other users' indications for that item of information.

29. The method of claim 28 wherein said prediction value is further based upon an attribute associated with the item of information.

30. The method of claim 29 wherein said item of information is the contents of said item of information.

31. The method of claim 29 wherein said item of information is the date on which said item of information was created.

32. The method of claim 23 wherein the items of information in said database comprise a plurality of different types of information.

33. The method of claim 23 wherein the likely degree of interest is determined for all of the items of information stored in said database in response to receipt of a user's request for access.

34. A method for providing information to users of a computer system, comprising the steps of:
- storing items of information in an unstructured database within the computer system;
- determining and storing user profiles for users of the computer system who have access to the items of information;
- receiving a request from a user for access to the stored information;
- determining the user's likely degree of interest in items of information stored in said database, in accordance with that user's profile, by establishing the correlation between indications provided by a given user and those provided by other users, and determining a prediction value for the item of information based upon said correlation and the other users' indications for that item of information;
- ranking the items of information in accordance with their determined degrees of interest; and
- displaying the items of information with an indication of their relative rankings.

35. The method of claim 34 wherein said items of information are displayed in order of their ranking.

36. The method of claim 34 further including the steps of selecting an item of information from those which are displayed, providing an indication of the user's actual interest in the selected item of information, and storing the user's indicated interest.

37. The method of claim 34 wherein said prediction value is further based upon an attribute associated with the item of information.

38. The method of claim 37 wherein said item of information is the contents of said item of information.

39. The method of claim 34 wherein the likely degree of interest is determined for all of the items of information stored in said database in response to receipt of a user's request for access.

* * * * *

UNITED STATES PATENT AND TRADEMARK OFFICE
CERTIFICATE OF CORRECTION

PATENT NO : 5,724,567

DATED : March 3, 1998

INVENTOR(S) : Rose et al.

It is certified that error appears in the above-identified patent and that said Letters Patent is hereby corrected as shown below:

In the claims:

Claim 28, column 12, line 8, "claim 23" should read --claim 27--

Signed and Sealed this

Twenty-seventh Day of July, 1999

*Attest:*

Q. TODD DICKINSON

*Attesting Officer*  *Acting Commissioner of Patents and Trademarks*

(12) EX PARTE REEXAMINATION CERTIFICATE (8343rd)
United States Patent
Rose et al.

(10) Number: US 5,724,567 C1
(45) Certificate Issued: Jun. 28, 2011

(54) SYSTEM FOR DIRECTING RELEVANCE-RANKED DATA OBJECTS TO COMPUTER USERS

(75) Inventors: Daniel E. Rose, Cupertino, CA (US); Jeremy J. Bornstein, Redwood City, CA (US); Kevin Tiene, Cupertino, CA (US); Dulce B. Ponceleón, Palo Alto, CA (US)

(73) Assignee: Apple Inc., Cupertino, CA (US)

Reexamination Request:
No. 90/010,775, Jan. 27, 2010

Reexamination Certificate for:
Patent No.: 5,724,567
Issued: Mar. 3, 1998
Appl. No.: 08/231,656
Filed: Apr. 25, 1994

Certificate of Correction issued Jul. 27, 1999.

(51) Int. Cl.
*G06F 17/30* (2006.01)

(52) U.S. Cl. .................. 707/734; 707/748; 707/751
(58) Field of Classification Search ................ None
See application file for complete search history.

(56) References Cited

U.S. PATENT DOCUMENTS

| | | |
|---|---|---|
| 5,034,807 A | 7/1991 | Von Kohorn |
| 5,237,157 A | 8/1993 | Kaplan |
| 5,264,933 A | 11/1993 | Rosser |
| 5,283,734 A | 2/1994 | Von Kohorn |
| 5,319,455 A | 6/1994 | Hoarty et al. |
| 5,410,344 A | 4/1995 | Graves |
| 5,446,919 A | 8/1995 | Wilkins |
| 5,483,276 A | 1/1996 | Brooks et al. |
| 5,483,278 A | 1/1996 | Strubbe |
| 5,483,472 A | 1/1996 | Overman |
| 5,508,731 A | 4/1996 | Kohorn |
| 5,515,270 A | 5/1996 | Weinblatt |
| 5,524,195 A | 6/1996 | Clanton |
| 5,564,073 A | 10/1996 | Takahisa |
| 5,574,939 A | 11/1996 | Keckler et al. |
| 5,592,375 A | 1/1997 | Salmon et al. |
| 5,600,364 A | 2/1997 | Hendricks et al. |
| 5,610,653 A | 3/1997 | Abecassis |
| 5,621,456 A | 4/1997 | Florin et al. |
| 5,684,918 A | 11/1997 | Abecassis |
| 5,734,853 A | 3/1998 | Hendricks et al. |
| 5,745,710 A | 4/1998 | Clanton et al. |

(Continued)

FOREIGN PATENT DOCUMENTS

| | | |
|---|---|---|
| EP | 0355697 A3 | 2/1990 |
| GB | 2254216 | 9/1992 |

OTHER PUBLICATIONS

Loeb et al., "Lessons from 'LyricTime': a Prototype Multimedia System," 4th IEEE ComSoc International Workshop on Multimedia Communications, Apr. 1992.

Loeb, "Architecting Personalized Delivery of Multimedia Information," Comm. Of the ACM, vol. 35(12), 1992.

Rothman, "A New Music Retailing Technology Says 'Listen Here'," New York Times, Jul. 4, 1993.

Sheth et al., "Evolving Agents for Personalized Information Filtering," Proc. 9th IEEE Conference on Artificial Intelligence for Applications, Orlando, FL, Mar. 1993.

*Primary Examiner*—Eric B Kiss

(57) ABSTRACT

An information access system stores items of information in an unstructured global database. When a user requests access to the system, the system delivers to that user an identification of only those items of information which are believed to be relevant to the user's interest. The determination as to the items of information that are relevant to a user is carried out by ranking each available item in accordance with any one or more techniques. In one approach, the content of each document is matched with an adaptive profile of a user's interest. In another approach, a feedback mechanism is provided to allow users to indicate their degree of interest in each item of information. These indications are used to determine whether other users, who have similar or dissimilar interests, will find a particular item to be relevant.

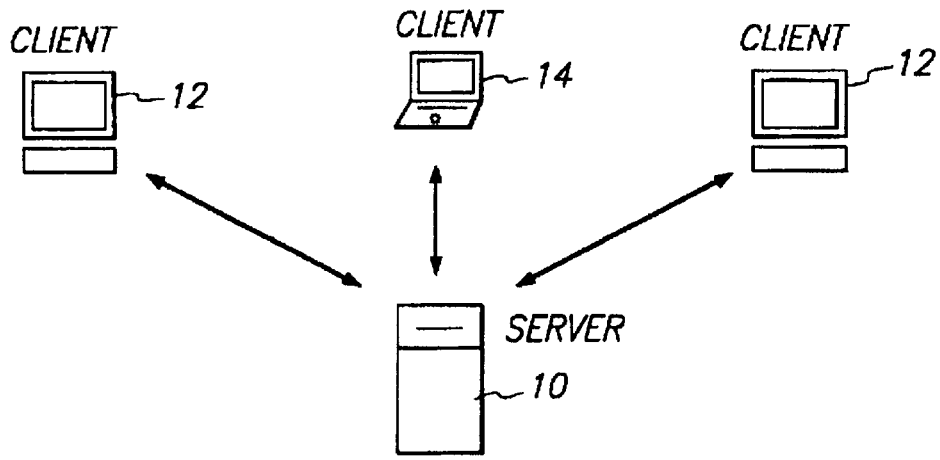

U.S. PATENT DOCUMENTS

| | | |
|---|---|---|
| 5,758,072 A | 5/1998 | Filepp et al. |
| 5,759,101 A | 6/1998 | Von Kohorn |
| 5,806,045 A | 9/1998 | Biorge et al. |
| 5,861,881 A | 1/1999 | Freeman et al. |
| 5,963,916 A | 10/1999 | Kaplan |
| 6,001,393 A | 12/1999 | Daoud |
| 6,553,178 B2 | 4/2003 | Abecassis |
| 6,738,978 B1 | 5/2004 | Hendricks et al. |

EX PARTE REEXAMINATION CERTIFICATE ISSUED UNDER 35 U.S.C. 307

NO AMENDMENTS HAVE BEEN MADE TO THE PATENT

AS A RESULT OF REEXAMINATION, IT HAS BEEN DETERMINED THAT:

The patentability of claims 1 and 23 is confirmed.

Claims 2-22 and 24-39 were not reexamined.

* * * * *